US011838318B2

(12) United States Patent
Krishnan et al.

(10) Patent No.: US 11,838,318 B2
(45) Date of Patent: *Dec. 5, 2023

(54) DATA PLANE WITH CONNECTION VALIDATION CIRCUITS

(71) Applicant: Barefoot Networks, Inc., Santa Clara, CA (US)

(72) Inventors: Shruthi Krishnan, Santa Clara, CA (US); Junggun Lee, Los Altos, CA (US); Changhoon Kim, Palo Alto, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/463,346

(22) Filed: Aug. 31, 2021

(65) Prior Publication Data

US 2022/0094711 A1      Mar. 24, 2022

Related U.S. Application Data

(63) Continuation of application No. 15/986,048, filed on May 22, 2018, now Pat. No. 11,108,812.

(Continued)

(51) Int. Cl.
*G06F 21/00* (2013.01)
*H04L 9/40* (2022.01)
(Continued)

(52) U.S. Cl.
CPC ........ *H04L 63/1458* (2013.01); *H04L 1/1657* (2013.01); *H04L 45/64* (2013.01); *H04L 63/1425* (2013.01); *H04L 12/56* (2013.01)

(58) Field of Classification Search
CPC . H04L 63/1458; H04L 45/64; H04L 63/1425; H04L 1/1657; H04L 12/56
See application file for complete search history.

(56) References Cited

U.S. PATENT DOCUMENTS 7,804,774 B2     9/2010  Yang et al.
7,940,657 B2     5/2011  Perreault et al.
(Continued)

OTHER PUBLICATIONS

U.S. Appl. No. 15/897,366, filed Feb. 15, 2018, Changhoon Kim.
"Bosshart, P., Gibb, G., Kim, H-S., Varghese, G., McKeown, N., Izzard, M., Mujica, F., and Horowitz, M., Forwarding Metamorphosis : Fast Programmable Match-Action Processing in Hardware for SDN, Aug. 2013, SIGCOMM, pp. 99-110" (Year: 2013).
Final Office Action for U.S. Appl. No. 15/897,361, dated Dec. 30, 2020, 6 pages.

(Continued)

*Primary Examiner* — Kendall Dolly
(74) *Attorney, Agent, or Firm* — Essential Patents Group, LLP; Christopher K. Gagne

(57) ABSTRACT

Some embodiments of the invention provide a data-plane forwarding circuit (data plane) that can be configured to provide protection from a SYN-flood denial of service attack by validating a source of a SYN data messages before allowing future messages to be forwarded to a protected server. To perform its forwarding operations, the data plane includes several data message processing stages that are configured to process the data tuples associated with the data messages received by the data plane. In some embodiments, parts of the data plane message-processing stages are also configured to operate as a connection-validation circuit that includes (1) a SYN-processing circuit to process SYN data messages received by the data plane, and (2) an ACK-processing circuit to process ACK data messages received by the data plane.

20 Claims, 7 Drawing Sheets

Related U.S. Application Data

(60) Provisional application No. 62/658,296, filed on Apr. 16, 2018.

(51) Int. Cl.
*H04L 1/1607* (2023.01)
*H04L 45/64* (2022.01)
*H04L 12/54* (2022.01)

(56) References Cited

U.S. PATENT DOCUMENTS

| | | | |
|---|---|---|---|
| 8,634,717 | B2 | 1/2014 | Kang et al. |
| 9,276,955 | B1 | 3/2016 | Jain |
| 9,413,783 | B1* | 8/2016 | Keogh ............... H04L 63/1458 |
| 10,181,912 | B1 | 1/2019 | Callaghan et al. |
| 2002/0032871 | A1 | 3/2002 | Malan et al. |
| 2004/0054924 | A1 | 3/2004 | Chuah et al. |
| 2006/0107318 | A1 | 5/2006 | Jeffries et al. |
| 2006/0272018 | A1 | 11/2006 | Fouant |
| 2007/0030850 | A1 | 2/2007 | Grosse |
| 2007/0130619 | A1 | 6/2007 | Reams |
| 2010/0220619 | A1 | 9/2010 | Chikira et al. |
| 2011/0072515 | A1 | 3/2011 | Park et al. |
| 2012/0151583 | A1 | 6/2012 | Kang et al. |
| 2012/0331160 | A1* | 12/2012 | Tremblay ............... H04L 67/56 709/228 |
| 2013/0003538 | A1 | 1/2013 | Greenberg et al. |
| 2013/0007880 | A1* | 1/2013 | Bosco ............... H04L 61/4511 709/201 |
| 2013/0074183 | A1 | 3/2013 | Yoon |
| 2013/0117847 | A1 | 5/2013 | Friedman et al. |
| 2014/0317739 | A1 | 10/2014 | Be'ery et al. |
| 2015/0058976 | A1 | 2/2015 | Carney et al. |
| 2015/0207706 | A1 | 7/2015 | Li et al. |
| 2016/0099964 | A1 | 4/2016 | Htay et al. |
| 2016/0248682 | A1* | 8/2016 | Lee ........................ H04L 63/08 |
| 2017/0085531 | A1 | 3/2017 | Song et al. |
| 2017/0149640 | A1 | 5/2017 | Narayanan et al. |
| 2017/0251077 | A1 | 8/2017 | Eerpini et al. |
| 2017/0257388 | A1 | 9/2017 | Addepalli et al. |
| 2017/0272465 | A1 | 9/2017 | Steele |
| 2017/0318043 | A1 | 11/2017 | Shin et al. |
| 2018/0041524 | A1 | 2/2018 | Reddy et al. |
| 2018/0109556 | A1 | 4/2018 | Yoo et al. |
| 2020/0252435 | A1* | 8/2020 | Robertson ............ H04L 63/105 |

OTHER PUBLICATIONS

Final Office Action for U.S. Appl. No. 15/897,366, dated Sep. 4, 2020, 59 pages.
First Office Action for U.S. Appl. No. 15/897,366, dated Jan. 24, 2020, 32 pages.
Flajolet, Philippe, et al., "Hyperloglog: the analysis of a near-Optimal cardinality estimation algorithm," 2007, 20 pages, Discrete Mathematics and Theoretical Computer Science, Nancy, France.
Hong, Sunghyuck. "Efficient and secure DNS cyber shelter on DDOS attacks." Nov. 26, 2014. Journal of Computer Virology and Hacking Techniques 11, 129-136 (Year: 2015).
Ijaz Ahmad et al., "Security in Software Defined Networks: A Survey", IEEE Communication Surveys and Tutorials, vol. 17, No. 4, Fourth Quarter 2015, pp. 2317-2346.
Liu, Zaoxing, et al., "One Sketch to Rule Them All: Rethinking Network Flow Monitoring with UnivMon," SIGCOMM 16, Aug. 22-26, 2016, 14 pages, ACM, Florianopolis, Brazil.
Moshref, Masoud, et al., "SCREAM: Sketch Resource Allocation for Software-defined Measurement," CoNEXT 15, Dec. 1-4, 2015, 13 pages, ACM, Heidelberg, Germany.
Non-Published Commonly Owned U.S. Appl. No. 15/897,361), filed Feb. 15, 2018, 51 pages, Barefoot Networks, Inc.
Non-Published Commonly Owned U.S. Appl. No. 15/897,366, filed Feb. 15, 2018, 52 pages, Barefoot Networks, Inc.
Second Office Action for U.S. Appl. No. 15/897,361, dated Jul. 30, 2021, 35 pages.
Sharma, Naveen KR., et al., "Evaluating the Power of Flexible Packet Processing for Network Resource Allocation," 14th USENIX Symposium on Networked Systems Design and Implementation (NSDI'17), Mar. 27-29, 2017, 17 pages, USENIX, Boston, MA, USA.
Notice of Allowance for U.S. Appl. No. 15/986,048, dated Apr. 28, 2021.
Office Action for U.S. Appl. No. 15/897,361), dated Dec. 20, 2022.
Office Action for U.S. Appl. No. 15/897,361), dated May 28, 2020.
Office Action for U.S. Appl. No. 15/897,361, dated May 3, 2022.
Office Action for U.S. Appl. No. 15/897,361, dated Sep. 13, 2022.
Office Action for U.S. Appl. No. 15/986,048, dated Dec. 31, 2020.
Notice of Allowance from U.S. Appl. No. 15/897,361 notified Mar. 30, 2023, 12 pgs.

* cited by examiner

DATA PLANE WITH CONNECTION VALIDATION CIRCUITS

CROSS-REFERENCE TO RELATED APPLICATIONS

This application is a continuation of U.S. patent application Ser. No. 15/986,048, filed May 22, 2018, which claims the benefit of U.S. Provisional Patent Application No. 62/658,296, filed Apr. 16, 2018. The entire specifications of which are hereby incorporated herein be reference in their entirety.

BACKGROUND

Protecting against denial of service attacks is an important function in a network. One method of protecting against denial of service attacks (e.g., a synchronization (SYN) flood attack) is the use of a SYN cookie technique which allows a server to validate a connection before allocating resources to that connection. Using this SYN cookie approach often involves hashing operations which can place a large burden on a general-purpose processor (e.g., CPU) of a server in the case of a SYN flood attack.

SUMMARY

Some embodiments of the invention provide a data-plane forwarding circuit (data plane) that can be configured to provide protection from a SYN-flood denial of service attack by validating a source or connection associated with a SYN data message before allowing future messages to be forwarded to a protected server. In some embodiments, the data plane processes data tuples associated with data messages received by the data plane in order to forward the data messages within a network. In some embodiments, the data plane is part of a network forwarding element (e.g., a switch, a router, etc.) that includes a control-plane circuit ("control plane") that configures the data plane. In other embodiments, the control plane that configures the data plane operates outside of the data plane's forwarding element (e.g., operates on a remote server).

To perform its forwarding operations, the data plane includes several data message processing stages that are configured to process the data tuples associated with the data messages received by the data plane. In some embodiments, parts of the data plane message-processing stages are also configured to operate as a connection-validation circuit that includes (1) A SYN/ACK detector to detect whether a data message is a SYN or an ACK data message that should be processed by the connection-validation circuit, (2) a SYN-processing circuit to process SYN data messages received by the data plane, and (3) an ACK-processing circuit to process ACK data messages received by the data plane. The operations of the data plane's message processing stages are configured by a control plane of the data plane's forwarding element in some embodiments. In some embodiments, a local control plane is implemented by a control software layer that is executed by one or more general purpose processors (e.g., CPUs) of the forwarding element, while a remote control plane is implemented by control software layer executing by one or more CPUs of another forwarding element or a remote computer (e.g., server).

In some embodiments, the data plane's SYN-processing circuit includes a whitelist circuit including a storage that stores a set of entries for a set of source IP addresses (or other compute node or connection identifiers) that are associated with data messages that have been validated by the connection-validation circuit. The SYN-processing circuit, in some embodiments, includes a SYN cookie generator circuit that is used to generate a SYN cookie that is placed as an initial sequence number in a SYN-acknowledgment (ACK) data message that is sent to the source of the SYN data message. In some embodiments, the generated SYN cookie is also placed in a timestamp field of the SYN-ACK data message. The SYN-processing circuit includes a SYN-ACK generator that generates a SYN-ACK data message including the generated SYN cookie, in some embodiments.

The ACK-processing circuit, in some embodiments, includes a SYN cookie validation circuit that validates received ACK data messages based on an included sequence number (an ACK number). In some embodiments, the SYN cookie validation circuit includes a set of SYN cookie generator circuits that are used to calculate a set of SYN cookies to compare to a sequence number included in a received ACK data message. The SYN cookie validation circuit includes a sequence number comparator circuit that compares the SYN cookies generated by the set of SYN cookie generator circuits to a sequence number included in the received ACK data message, in some embodiments. The ACK-processing circuit, in some embodiments, includes a reset (RST) data message generator circuit that generates a RST data message that is sent to the source of a validated ACK data message. In some embodiments, a SYN/ACK detector circuit determines if a received data message is a SYN or ACK data message and directs the data message to the correct data message processing circuit. The SYN/ACK detector circuit, in some embodiments, determines (1) if a data message is a SYN or ACK data message and (2) whether any policies or rules provided by a user (e.g., manufacturer, datacenter administrator, tenant, etc.) indicate that the received data message should be processed by the connection validation circuit or forwarded to its destination without validation.

For a received SYN data message sent to a destination compute node (e.g., server), the SYN-processing circuit determines whether a whitelist circuit contains an entry corresponding to a set of header field values (e.g., a source IP address, or a source IP address and source port, etc.). In some embodiments, the whitelist circuit includes a set of hash calculation circuits that calculate different hash values from the relevant set of header field values to implement a bloom filter and a set of storage (e.g., memory) circuits that store the whitelist entries.

When the whitelist circuit stores an entry corresponding to the set of header field values, the SYN data message is forwarded to the destination of the SYN data message without modification by the SYN-processing circuit. When the whitelist circuit does not store an entry corresponding to the set of header field values, the SYN-processing circuit uses a SYN cookie generator circuit to generate a SYN cookie to include as an initial sequence number in a SYN-ACK data message that the SYN-processing circuit generates. In some embodiments, the SYN cookie is generated based on a set of header field values that do not change between a SYN data message and an ACK data message sent to establish a connection (e.g., a transmission control protocol (TCP) connection). An additional value (e.g., a nonce) is used, in some embodiments, to generate the SYN cookie. In some embodiments, the additional value is supplied to a storage of the data-plane circuit by a control circuit (control-plane circuit) and is updated at regular intervals.

After the SYN cookie is generated, the SYN-processing circuit generates a SYN-ACK data message using the generated SYN cookie and forwards the generated SYN-ACK data message to the source compute node using the SYN cookie as an initial sequence number. In some embodiments, the forwarding is performed by the data-plane circuit. The original SYN data message is not forwarded to the destination compute node (e.g., server) in order to protect the destination compute from a denial of service attack (e.g. a SYN flood attack).

For a received ACK data message, some embodiments first compare a timestamp with an ACK number (a sequence number of the received ACK data message). If the timestamp comparison indicates that the ACK data message is a response to a SYN-ACK data message generated by the SYN-processing circuit, the ACK-processing circuit uses a set of SYN cookie generator circuits to calculate a set of SYN cookies that are used by a validation circuit to validate the ACK data message. In some embodiments, the set of SYN cookies are based on the same header field values as are used to generate the SYN-ACK data message. The set of SYN cookies, in some embodiments, is generated a corresponding set of nonce values. In some embodiments, the set of nonce values includes (1) a current nonce value provided by the control circuit and (2) a set of immediately previous nonce values provided by the control circuit. In some embodiments, a control circuit provides a new nonce value periodically or based on a detected event (e.g., a certain number of SYN data messages received, a certain number of SYN-ACK data messages generated with the additional value, etc.).

If either the timestamp or ACK number comparison indicate that the ACK is not a valid response to a SYN-ACK data message generated by the SYN-processing circuit, the data message is forwarded to its destination by data message processing stages that are configured to process the data tuples associated with the data messages received by the data plane. If the validation circuit of the ACK-processing circuit indicates that the received ACK data message is a valid response to a SYN-ACK data message generated by the SYN-processing circuit, in some embodiments, the ACK-processing circuit adds an entry into the whitelist corresponding to the validated ACK data message. In some embodiments, adding an entry is accomplished by modifying a header vector used by other data message processing stages of the data plane circuit. The whitelist, in some embodiments, is cleared periodically to avoid false positives. The control circuit, in some embodiments, clears the whitelist.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
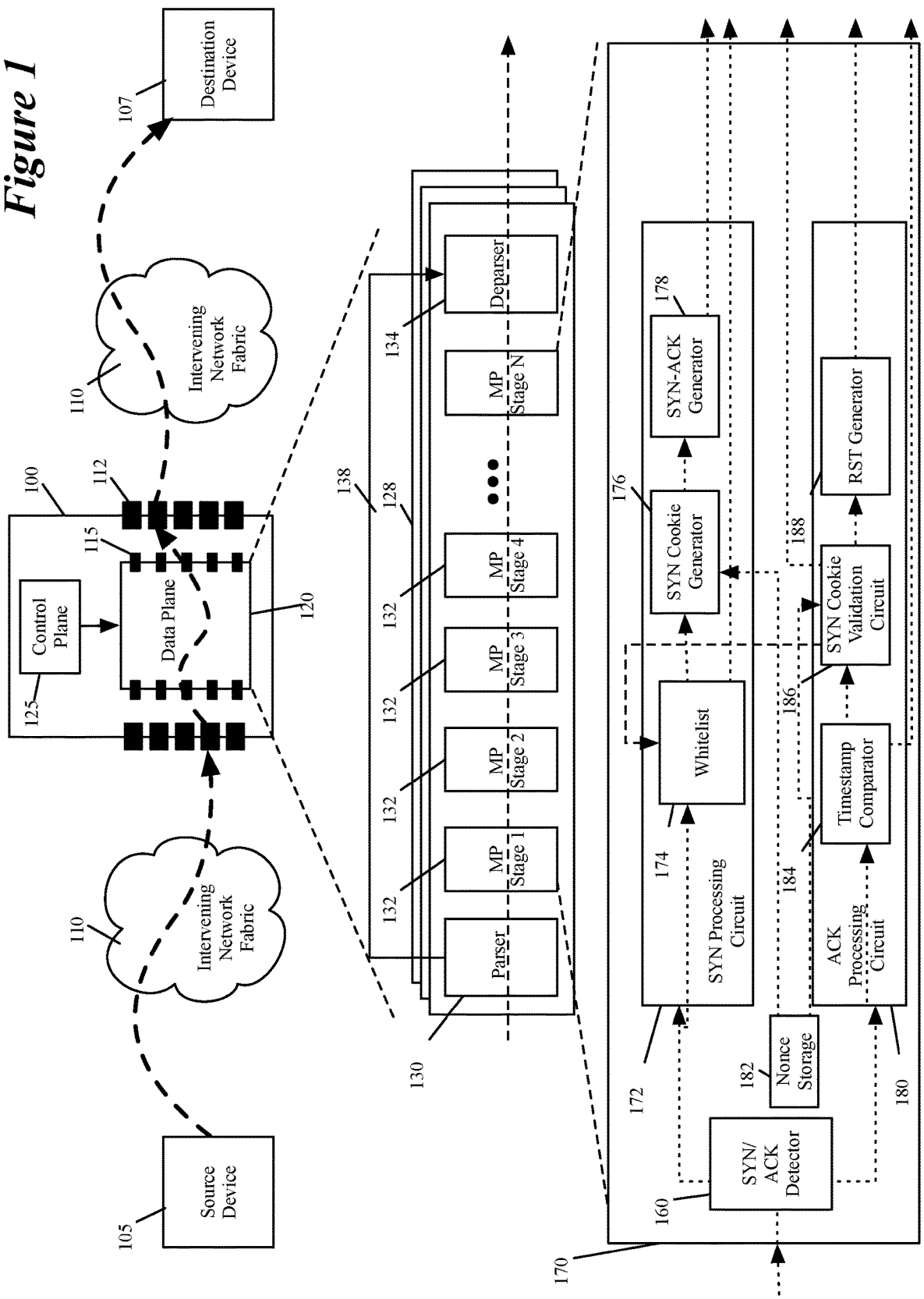
FIG. 1 illustrates an example of a forwarding element with a data plane circuit that can be configured to operate as a connection-validation circuit to provide protection from denial of service attacks.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a data-plane forwarding circuit (data plane) that can be configured to provide protection from a SYN-flood denial of service attack by validating a source of a SYN data messages before allowing future messages to be forwarded to a protected server. In some embodiments, the data plane processes data tuples associated with data messages received by the data plane in order to forward the data messages within a network. In some embodiments, the data plane is part of a network forwarding element (e.g., a switch, a router, etc.) that includes a control-plane circuit ("control plane") that configures the data plane. In other embodiments, the control plane that configures the data plane operates outside of the data plane's forwarding element (e.g., operates on a remote server).

To perform its forwarding operations, the data plane includes several data message processing stages that are configured to process the data tuples associated with the data messages received by the data plane. In some embodiments, parts of the data plane message-processing stages are also configured to operate as a connection-validation circuit that includes (1) A SYN/ACK detector to detect whether a data message is a SYN or an ACK data message, (2) a SYN-processing circuit to process SYN data messages received by the data plane, and (3) an ACK-processing circuit to process ACK data messages received by the data plane. The operations of the data plane's message processing stages are configured by a control plane of the data plane's forwarding element in some embodiments. In some embodiments, a local control plane is implemented by a control software layer that is executed by one or more general purpose processors (e.g., CPUs) of the forwarding element, while a remote control plane is implemented by control software layer executing by one or more CPUs of another forwarding element or a remote computer (e.g., server).

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2 layer 3, layer 4, and layer 7) are references respectively to the second data link layer, the third network layer, the fourth transport layer, and the seventh application layer of the OSI (Open System Interconnection) layer model.

FIG. 1 illustrates an example of a forwarding element 100 with a data plane circuit 120 that can be configured to operate as a connection-validation circuit to provide protection from denial of service attacks. The forwarding element 100 forwards data messages within a network 110. The forwarding element 100 can be any type of forwarding element, such as a switch, a router, a bridge, etc.

In FIG. 1, the forwarding element is deployed as a non-edge forwarding element in the interior of the network to forward data messages from a source device 105 to a destination device 107. In other cases, this element 100 is deployed as an edge forwarding element at the edge of the network to connect to compute devices (e.g., standalone or host computers) that serve as sources and destinations of the data messages. As a non-edge forwarding element, the forwarding element 100 forwards data messages between forwarding elements in the network (i.e., through intervening network fabric 110), while as an edge forwarding element, the forwarding element forwards data messages to and from edge compute devices to each other, to other edge forwarding elements and/or to non-edge forwarding elements.

As shown, the forwarding element 100 includes (1) a data plane circuit 120 (the "data plane") that performs the forwarding operations of the forwarding element 100 to forward data messages received by the forwarding element to other devices, and (2) a control plane circuit 125 (the "control plane") that configures the data plane circuit. The forwarding element 100 also includes physical ports 112 that receive data messages from, and transmit data messages to, devices outside of the forwarding element 100. The data plane circuit 120 includes ports 115 that receive data messages to process and to transmit data messages after they have been processed. Some ports 115 of the data plane 120 are associated with the physical ports 112 of the forwarding element 100, while other ports 115 are associated with other modules of the data plane 120.

The data plane includes several configurable (i.e., programmable) message-processing stages 132 that can be configured to perform the data-plane forwarding operations of the forwarding element 100 to process and forward data messages to their destinations. These message-processing stages perform these forwarding operations by processing data tuples (e.g., message headers) associated with data messages received by the data plane 120 in order to determine how to forward the messages.

As further described below, these message-processing stages 132 can also be configured to operate as a connection-validation circuit 170 that includes (1) a SYN/ACK detector circuit 160 to detect if a received data message is a SYN or ACK data message that should be processed by the connection-validation circuit 170, (2) a SYN-processing circuit 172 to process SYN data messages received by the data plane 120, and (3) an ACK-processing circuit 180 to process ACK data messages received by the data plane 120. As further described below, the message-processing stages in some embodiments include match-action units (MAUs) that try to match data tuples (e.g., header vectors) of messages with table records that specify action to perform on the data tuples.

The configurable message-processing circuits 132 are grouped into multiple message-processing pipelines 128. The message-processing pipelines can be ingress or egress pipelines before or after the forwarding element's traffic management stage that serves as a crossbar switch that directs messages from the ingress pipelines to egress pipelines.

Each pipeline includes a parser 130, several message-processing stages 132, and a deparser 134. A pipeline's parser 130 extracts a message header from a data message that the pipeline receives for processing. In some embodiments, the extracted header is in a format of a header vector (HV) that is processed, and in some cases modified, by successive message processing stages 132 as part of their message processing operations. The parser 130 of a pipeline passes the payload of the message to the deparser 134 as the pipeline's message-processing stages 132 operate on the header vectors. In some embodiments, the parser also passes the message header to the deparser 134 along with the payload (i.e., the parser passes the entire message to the deparser).

When a pipeline 128 finishes processing a data message and the message has to be provided to the traffic management stage (in case of an ingress pipeline) or to a port 115 (in case of an egress pipeline) to be forwarded to the message's next hop (e.g., to its destination compute node or next forwarding element), a deparser of the pipeline in some embodiments produces the data message header from the message's header vector that was processed by the pipeline's last message processing stage, and combines this header with the data message's payload. In some embodiments, the deparser 134 uses part of the header received from the parser 130 to reconstitute the message from its associated header vector.

In some embodiments, one or more message-processing stages 132 of each ingress pipeline are configured to implement the SYN/ACK detector circuit 160, the SYN-processing circuit 172, and the ACK-processing circuit 180. The SYN/ACK detector circuit 160 inspects each packet to determine if it is a SYN or ACK data message that needs to be processed by the SYN-processing circuit 172, or the ACK-processing circuit 180. In some embodiments, this determination includes determining whether a user (manufacturer, data center administrator, tenant, etc.) has defined rules for which data messages require validation (e.g., all data messages for a certain tenant, all data messages to a set of IP address, data messages not having a certain set of header values, etc.).

For a data message that requires processing by the SYN-processing circuit 172, the SYN-processing circuit 172 examines the SYN data message processed by its pipeline to determine whether it has an entry for a source IP address (or other source or connection identifier) in whitelist 174 indicating that the data message is to be forwarded. The SYN-processing circuit 172 also includes a SYN cookie generator circuit 176 to generate a SYN cookie based on attributes of the received data message (e.g., header values such as source IP, destination IP, source port, destination port, protocol, etc.). In some embodiments, the SYN cookie generator circuit retrieves the attributes from the HV provided by parser 130 or a previous processing stage 132. In some embodiments, the SYN cookie generator circuit 176 also bases the SYN cookie on a nonce retrieved from nonce storage 182. Some embodiments, generate the SYN cookie using a hashing function that takes the inputs (e.g., a set of header values and a nonce value) and produces a value (e.g., a 32-bit number to fit in a 32-bit sequence number field of a SYN-ACK data message). The SYN cookie generator circuit 176, in some embodiments, provides the SYN cookie to a SYN-ACK generator 178 for the SYN-ACK generator 178 to include as an initial sequence number (e.g., in a sequence number field) in a generated SYN-ACK data message. In some embodiments, the SYN cookie is also included in a timestamp field.

The nonce storage 182, in some embodiments, stores at least one nonce value (e.g., a randomized variable) that is provided specifically for the sequence number generation. In some embodiments, the nonce value is provided by a control circuit (e.g., control plane 125, or an external CPU). In some embodiments, the control circuit updates the nonce value periodically (e.g., every two seconds, or after a certain number of data messages have been received) or based on detecting an event that indicates a SYN flood attack (e.g., a large number of SYN data messages without a corresponding number of ACK or FIN data messages). The nonce storage 182, in some embodiments, stores N nonce values in a first in, first out (FIFO) manner such that only the most recent N values are stored. In such embodiments, only the most recent value is provided to SYN cookie generator circuit 176 for generating the SYN cookie provided to the SYN-ACK generator 178.

In some embodiments, generating the SYN-ACK data message comprises modifying header values of the received SYN data message. Modifying the headers, in some embodiments, includes swapping the source and destination IP and port fields and incrementing sequence number field values in the header. Once the SYN-ACK data message is generated, in some embodiments, the HV is updated to reflect the modified header values of the generated SYN-ACK data message to be forwarded to the source of the SYN data message. Once the SYN-ACK data message is generated it is forwarded to the source of the SYN data message.

For a data message that requires processing by the ACK-processing circuit 180 (as determined by SYN/ACK detector circuit 160), the ACK-processing circuit 180 examines the ACK data message processed by its pipeline to determine if it is a valid response to a generated SYN-ACK data message. In some embodiments, the ACK-processing circuit 180 includes a timestamp comparator 184 that first determines whether a timestamp corresponds to an ACK number (e.g., a sequence number) (e.g., whether the timestamp is equivalent to the ACK number decremented by one). In embodiments that place the generated SYN cookie in the timestamp field, if the timestamp does not correspond to the ACK number of the ACK data message, the ACK data message can be forwarded to its destination without further validation because it is not an ACK data message that is part of establishing a connection through the connection validation circuit 170. This first determination can (1) reduce the likelihood of an erroneous determination that an ACK data message is a response to a generated SYN-ACK data message when it is actually part of an established connection and (2) reduce the number of hash calculations (used in the sequence number generation process, in some embodiments) that are necessary. For example, If the timestamp and sequence number (ACK number) fields each comprise 32 bits, the likelihood of a timestamp corresponding to an ACK number is roughly 1 in $2^{32}$ which is compounded by the likelihood of an ACK number corresponding to a generated SYN cookie (e.g., 1 in $2^{32}$) for a total probability of an erroneous determination of approximately 1 in $2^{64}$.

If the first determination indicates that the timestamp does not correspond to the ACK number of the ACK data message decremented by one, the ACK data message is assumed to be part of an existing connection or session and will be forwarded to the destination. But, if the first determination indicates that the timestamp corresponds to the ACK number of the ACK data message decremented by one, the ACK-processing circuit 180 uses SYN cookie validation circuit 186 to compare a set of generated SYN cookies to the ACK number of the ACK data message. The set of generated SYN cookies, in some embodiments, are generated by a set of SYN cookie generator circuits. In some embodiments, each SYN cookie in the set of SYN cookies is based on data message attributes of the ACK data message and one nonce value in the nonce storage 182. In some embodiments not using a nonce value for SYN cookie generation, a single SYN cookie is calculated and compared to the ACK number of the ACK data message. If any of the ACK numbers correspond to the SYN cookie included in the ACK data message (i.e., are equivalent to the ACK number decremented by one), the ACK data message is assumed to be a valid response to a SYN-ACK data message generated by the SYN-processing circuit 172 and a set of entries corresponding to the source IP address (or other set of source or connection identifiers) is added to the whitelist for comparison to future SYN data messages. If none of the SYN cookies correspond to the ACK number included in the ACK data message, the ACK data message is assumed to be part of an existing connection or session and will be forwarded to the destination.

Figure 2:
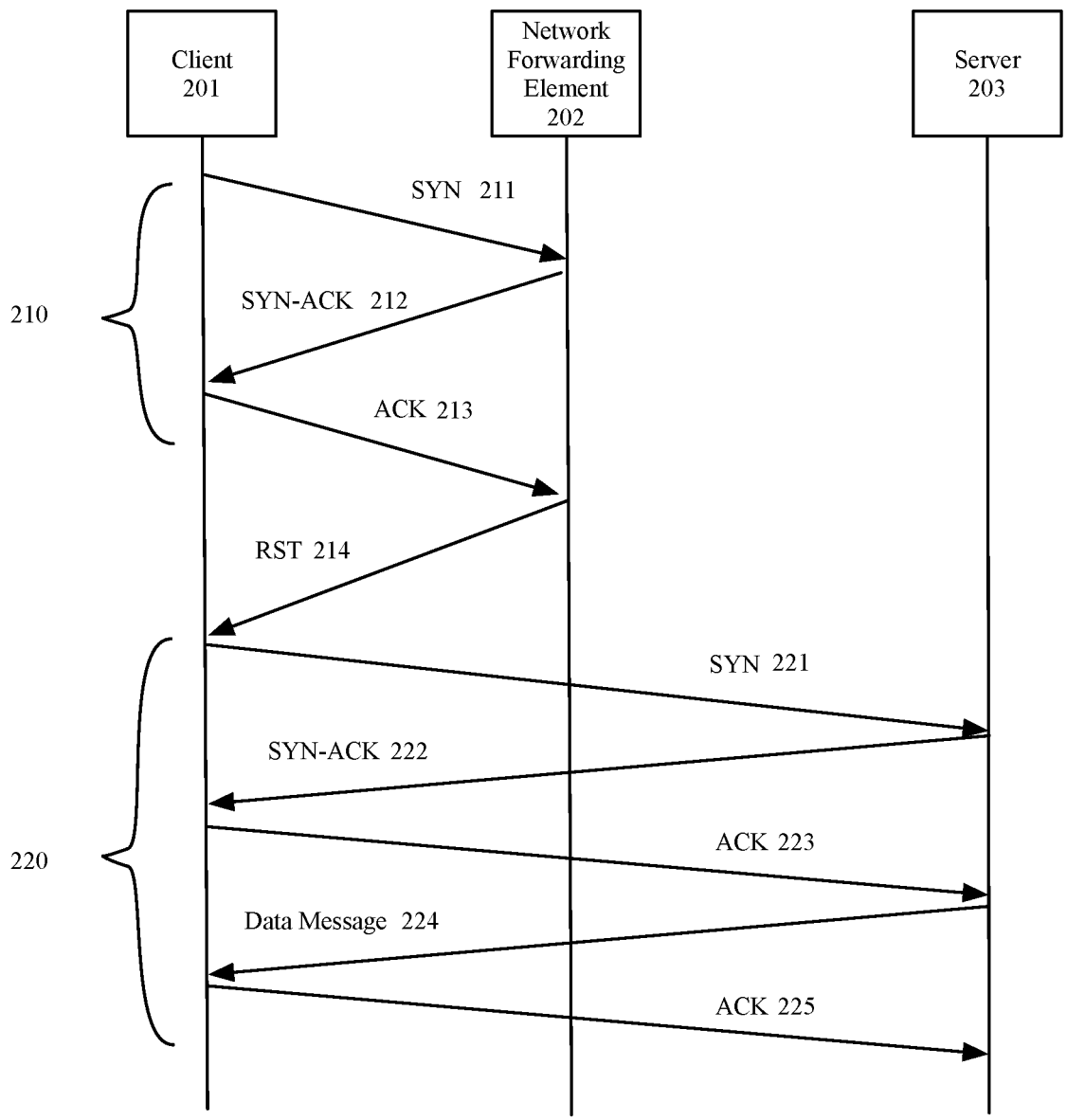
FIG. 2 conceptually illustrates a standard exchange of data messages when using a networking forwarding element configured to operate as a connection-validation circuit.

FIG. 2 conceptually illustrates a standard exchange of data messages when using a networking forwarding element 202 configured with the functionality described in relation to forwarding element 100 of FIG. 1. FIG. 2 depicts a client 201, a network forwarding element 202, and a server 203. Data message set 210 represents a set of data messages exchanged between client 201 and network forwarding element 202 as client 201 attempts to establish a connection to server 203.

Data message set 210 begins with a synchronization data message 211 that has source addresses corresponding to client 201 and destination addresses corresponding to server 203. Network forwarding element 202 determines that the source is not yet verified (e.g., that the source IP does not match a set of entries in a whitelist) and generates a SYN-ACK data message 212. A source may not be verified because it is a first SYN data message received from the source after a whitelist has been cleared or initiated. In some embodiments, SYN-ACK data message 212 includes a SYN cookie that is a hash value based on a set of data message attributes that does not change between SYN and ACK data messages in a sequence number field. Client 201 receives the SYN-ACK data message and responds with an ACK data message 213. ACK data message 213 contains the SYN cookie included in the SYN-ACK message incremented by one that the network forwarding element 202 uses to validate the ACK data message (and the client 201). Once the ACK data message is validated as described above in FIG. 1 and as will be described further in FIG. 5, a reset (RST) data message 214 is sent from network forwarding element 202 to client 201 to cause client 201 to generate a new SYN data message for server 203.

Data message set 220 represents a set of data messages establishing a connection/session (data messages 221-223) and a subsequent data message 224 and ACK data message 225 sent by the server 203 and the client 201 respectively. The SYN data message in this exchange is recognized by network forwarding element 202 and is therefore processed without generating a SYN-ACK data message. The ACK data messages 223 and 225 are forwarded to the server without triggering a RST data message, because their sequence numbers do not match the SYN cookie generated by the network forwarding element 202. Data message 224 is neither a SYN nor an ACK data message and therefore does not trigger the connection-validation circuit of the network forwarding element.

Figure 3:
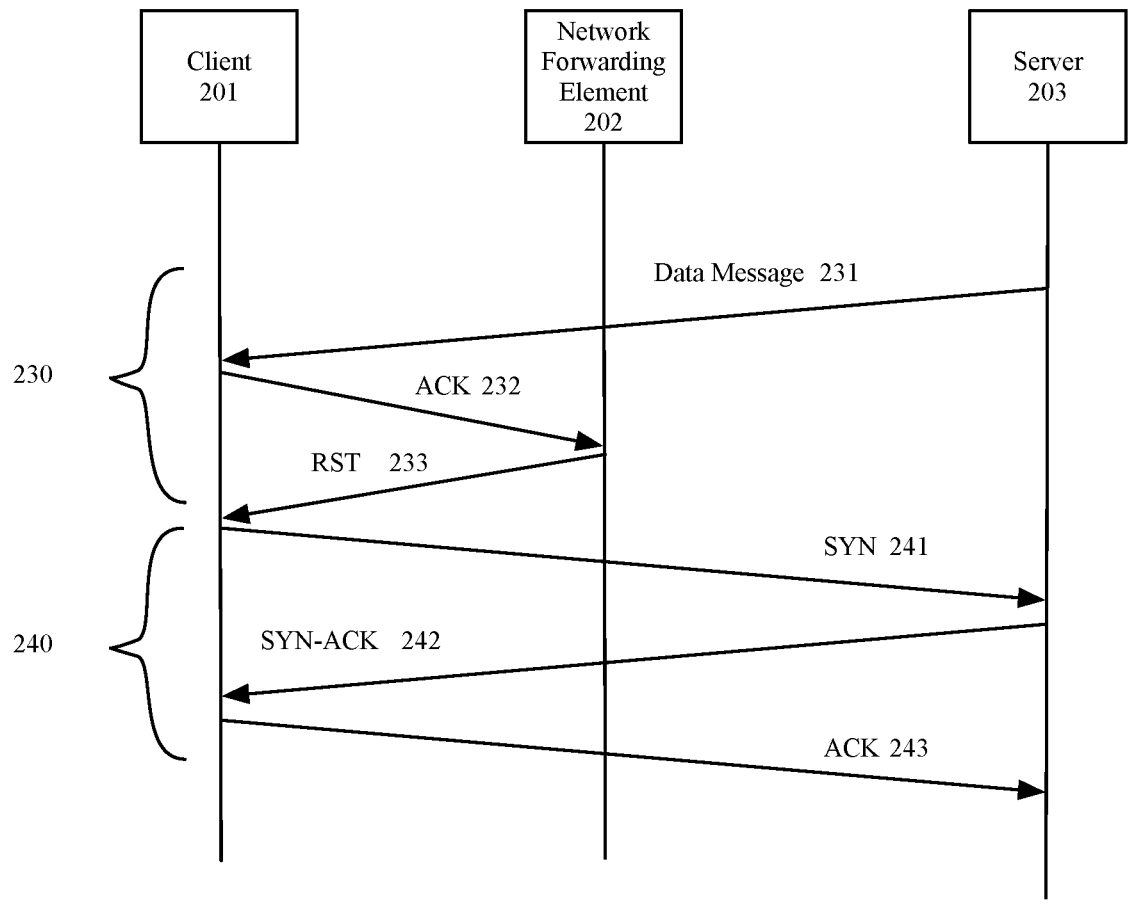
FIG. 3 conceptually illustrates an exchange of data messages for an established connection that is incorrectly reset by a networking forwarding element configured to operate as a connection-validation circuit.

FIG. 3 conceptually illustrates an exchange of data messages for an established connection that is incorrectly reset by networking forwarding element 202 configured with the functionality described in relation to forwarding element 100 of FIG. 1. FIG. 3 uses similar numbering as FIG. 2.

Data message set 230 represents a set of data messages for which an ACK data message is incorrectly identified as a response to a SYN-ACK data message generated by network forwarding element 202. An ACK data message is incorrectly identified as a response to a generated SYN-ACK data message, in some embodiments, when the ACK number happens to correspond to a SYN cookie generated by the ACK-processing circuit. In response to ACK data message 232 being incorrectly identified, network forwarding element 202 sends RST data message 233. RST data message 233 initiates data message set 240 which establishes a new connection to replace the connection previously established in data message set 220.

Figure 4:
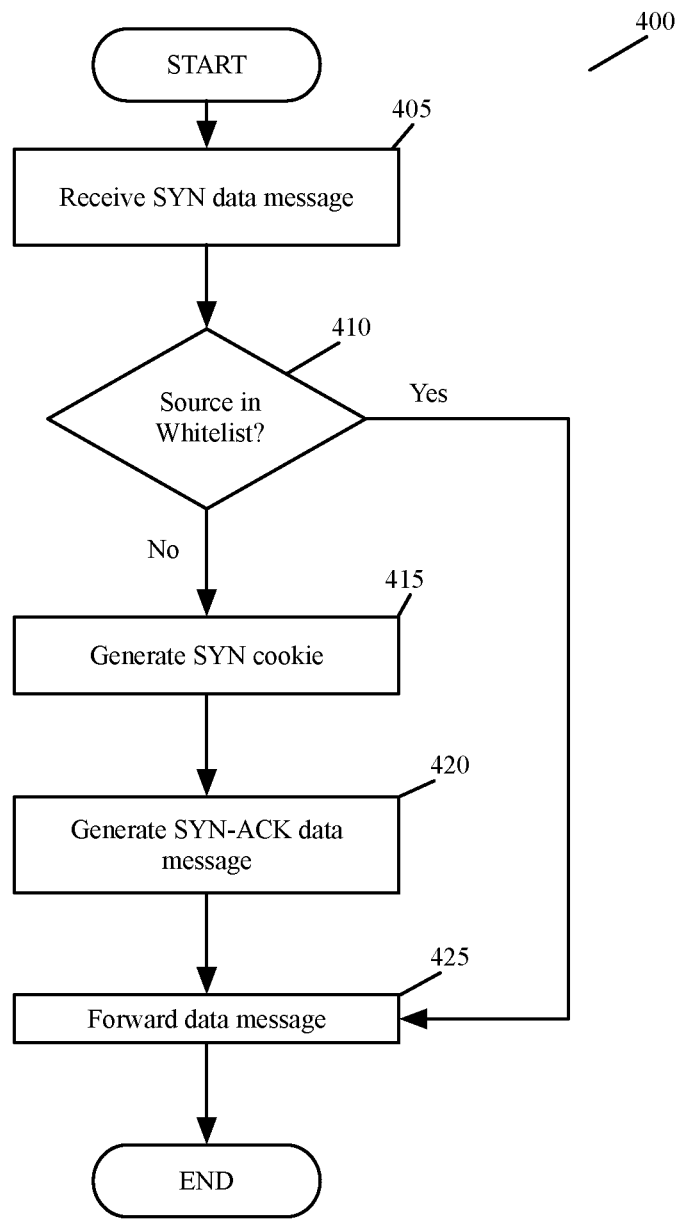
FIG. 4 conceptually illustrates a SYN-processing process.

FIG. 4 conceptually illustrates a SYN-processing process 400 that the SYN-processing circuit 172 performs in some embodiments. This process is collectively performed by the message processing stages that implement the SYN-processing circuit 172. This process is performed for each received data message that has to be examined by the SYN-processing circuit 172 as determined by SYN/ACK detector 160.

As shown, the SYN-processing process 400 initially receives (at 405) a SYN data message. The SYN data message is received at the SYN-processing circuit 172, in some embodiments, from a SYN/ACK detector circuit 160 based on an identification of the data message as a SYN data message by a SYN/ACK detector. In some embodiments, the identification is based on a bit in the data message header that indicates that it is a SYN data message. A SYN data message is differentiated from a SYN-ACK data message, in some embodiments, by the lack of an additional bit in the data message header that indicates that the data message is an ACK data message. In some embodiments, additional criteria (e.g., header values such as source and destination IP addresses, source and destination ports, or associated applications, etc.) for data messages requiring process 400 are specified either by a manufacturer, datacenter administrator, or end user. SYN data messages may be part of a legitimate attempt to initiate a connection with a destination compute node (e.g., a server) or may be part of a denial of service (DoS) attack such as a SYN flood attack in which a large number of SYN data messages are sent to a particular compute node to tie up resources used to maintain the state of the multiple half-open connections such that resources are unavailable when requests for legitimate connections are received.

The received SYN data message, in some embodiments, includes one or more header values of the connection's associated message header, e.g., the connection's five tuple identifier, which are source and destination IP address, source and destination ports, and protocol. In some embodiments, this information is included in a header vector (HV) provided by a parser or an earlier message processing stage. Process 400 uses the one or more header values (e.g., source IP address, or a source IP address and source port, etc.) to determine (at 410) whether the source compute node is in a whitelist maintained for the connection-validation process. In some embodiments, each pipeline 128 maintains its own whitelist. The whitelist, in some embodiments, is based on a set of header values (e.g., source IP, source IP and source port, etc.). The set of header values, in some embodiments, is a set of header values that does not change for different data messages in a same connection or different data messages from a same source compute node (e.g., client). The whitelist, in some embodiments, is implemented as an exact match table for the set of header values.

In some embodiments, the whitelist is implemented as a bloom filter. In order to add a set of entries for a member of the whitelist, the bloom filter of some embodiments calculates multiple (e.g., 4) hash values based on the set of header values for a particular verified data message and enters a value of 1 for each bit corresponding to a calculated hash value. In some embodiments, the bloom filter maintains a separate set of bits for each hash calculation such that the total number of bits is divided by the number of hash values used for the bloom filter (e.g., 4,194,304 bits may be allocated for a bloom filter using four hash values, each hash value having a corresponding set of 1,048,576 bits). A SYN data message is allowed by the whitelist when the set of hash values calculated based on the header values of the SYN data message correspond to a set of bits that have all been set equal to 1. While a bloom filter allows for no false negatives, a false positive is possible if the set of bits for a particular SYN data message were set to 1 by a set of other entries added to the bloom filter. In order to minimize false positives, some embodiments allocate the maximum allowed stateful memory available to be used for the bloom filter. To further minimize false positives, some embodiments also periodically (e.g., every 2 minutes, or after every 500K entries to the whitelist) clear the bloom filter. Clearing the bloom filter, in some embodiments, is performed by a control circuit (e.g., control plane 125).

If SYN-processing process 400 determines (at 410) that the SYN data message is allowed by the whitelist (e.g., matches a whitelist entry, or set of entries in the bloom filter), the data message is forwarded (at 425) to the destination and the process ends. If, however, SYN-processing process 400 determines (at 410) that the SYN data message is not allowed by the whitelist, a SYN cookie is generated (at 415) by the SYN-processing circuit. The SYN cookie, in some embodiments, is generated based on a set of header values of the SYN data message. In some embodiments, the set of header values used for the SYN cookie generation is different from the set of values used for the whitelist and identifies the TCP connection that the client is attempting to establish. In some embodiments, a nonce value is also used as the basis for the SYN cookie generation. The nonce value, in some embodiments, is a value provided by a control circuit (e.g., control plane 125) and is rotated periodically (e.g., every 2 seconds, or after every 2000 received SYN data messages or hash calculations). In some embodiments, a set of previous nonce values are saved in a first-in, first-out (FIFO) storage to allow for verification of an ACK data message based on any of the set of stored nonce values in the case that a nonce value is switched between a SYN-ACK data message and the responsive ACK data message.

The SYN cookie generated (at 415) is then used in generating (at 420) a SYN-ACK data message. The SYN-ACK data message is generated by the SYN-processing circuit 172, in some embodiments, using the SYN cookie as an initial sequence number (e.g., including the SYN cookie in a sequence number field). In some embodiments, the SYN cookie is also used in a timestamp field. The generated SYN-ACK data message, in some embodiments, is constructed to appear as if it was a response to the SYN data message from the destination compute node (e.g., including the SYN data message's destination IP address as a source IP address of the generated SYN-ACK data message and an incremented client sequence number). Generating the SYN-ACK data message, in some embodiments, includes modifying the header vector of a received SYN data message and generating or modifying a header vector used to process the generated SYN-ACK data message. In some embodiments, modifying the headers includes swapping the source and destination IP and port fields and incrementing sequence number field values in the header. Once the SYN-ACK data message is generated, in some embodiments, the HV is updated to reflect the modified header values of the generated SYN-ACK data message to be forwarded to the source of the SYN data message.

Once the SYN-ACK data message is generated the process forwards (at 425) the generated SYN-ACK data message to the source compute node (e.g., client) that sent the received SYN data message. The generated SYN-ACK data message, in some embodiments, is forwarded based on a header vector associated with the generated SYN-ACK data message as discussed above. The process then ends.

The generated SYN-ACK data message then traverses the network and is received at the source compute node that sent the SYN data message to establish a connection. The source compute node generates an ACK data message in response to the received SYN-ACK data message. The ACK data message includes a sequence number that is the generated SYN cookie included in a sequence number field incremented by 1 and, in some embodiments, includes the generated SYN cookie as a timestamp value. In some embodiments, the ACK data message is sent to the same destination address and port as the SYN data message and the source compute node is unaware that the SYN-ACK data message was generated by the forwarding element.

Figure 5:
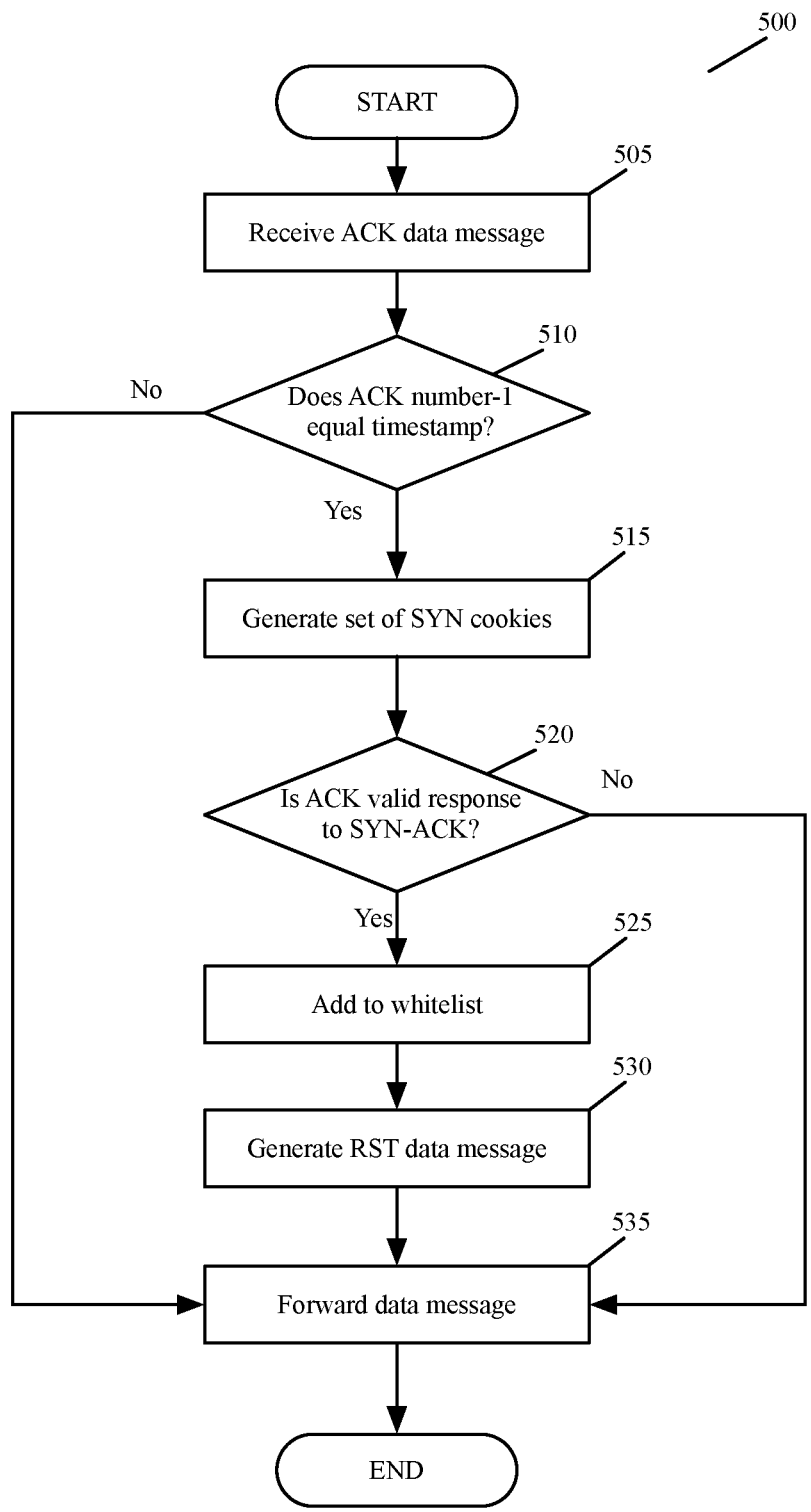
FIG. 5 conceptually illustrates an ACK-processing process.

FIG. 5 conceptually illustrates an ACK-processing process 500 that the ACK-processing circuit 180 performs in some embodiments. This process is collectively performed by the message processing stages that implement the ACK-processing circuit 180. This process is performed for each received data message that has to be examined by the ACK-processing circuit 180 as determined by SYN/ACK detector 160.

As shown, the ACK-processing process 500 initially receives (at 505) an ACK data message. The ACK data message is received at the ACK-processing circuit 180, in some embodiments, based on an identification of the data message as an ACK data message by SYN/ACK detector 160. In some embodiments, the identification is based on a bit in the data message header that indicates that it is an ACK data message. An ACK data message is differentiated from a SYN-ACK data message, in some embodiments, by the lack of an additional bit in the data message header that indicates that the data message is an SYN data message. In some embodiments, additional criteria (e.g., header values such as source and destination IP addresses, source and destination ports, or associated applications, etc.) for data messages requiring process 500 are specified either by a manufacturer, datacenter administrator, or end user. ACK data messages may be part of a legitimate attempt to initiate a connection with a destination compute node (e.g., a server) or may be part of a data message exchange once a connection has been established. The ACK-processing circuit 180 performs process 500 to differentiate between the different types of ACK data messages and process them accordingly.

The received ACK data message, in some embodiments, includes one or more header values of the connection's associated message header, e.g., the connection's five tuple identifier, which are source and destination IP address, source and destination ports, and protocol. In some embodiments, this information is included in a header vector (HV) provided by a parser or an earlier message processing stage. Process 500 uses the one or more header values to determine (at 510-520) whether the ACK data message is a valid response to a generated SYN-ACK data message or is an ACK data message of an established connection.

Process 500 determines (at 510) whether a timestamp is equal to an ACK number (e.g., a sequence number included in the ACK data message) decremented by one. This determination is omitted in some embodiments, but in embodiments making the determination, the improbability of randomly having a generated SYN cookie that is equivalent to an ACK number decremented by 1 is compounded by the improbability of having a timestamp value that is simultaneously equivalent to the ACK number decremented by 1. The determination (at 510) thus reduces the probability that an ACK data message for an established connection will be mistaken for an ACK data message sent in response to the generated SYN-ACK data message. If the timestamp is not equal to the ACK number decremented by 1, the ACK data message is forwarded (at 535) to the destination and the process ends. The determination (at 510) also reduces the need to generate SYN cookies, as SYN cookies do not need to be generated for any ACK data messages that do not have a timestamp value that is an ACK number decremented by 1.

If the process determines (at 510) that the timestamp is equal to the ACK number decremented by one (or if the determination is skipped), the process generates (at 515) a set of SYN cookies based on header values and, in some embodiments, a set of nonce values, with each SYN cookie based on only one nonce value. The set of SYN cookies, in some embodiments, comprise a set of N SYN cookies based on a most-recent set of N nonce values used by the SYN-processing circuit 172, to allow for changing nonce values between generating the SYN cookie for inclusion in the SYN-ACK data message and generating the SYN cookie for a received ACK data message.

The process then determines (at 520) whether the ACK data message is a valid response to a generated SYN-ACK data message. In some embodiments, determining whether a received ACK data message is a valid response to a generated SYN-ACK data message comprises comparing a ACK number contained in the ACK data message number to each of the set of generated SYN cookies to determine if any of the generated SYN cookies is one less than the ACK number. If no generated SYN cookie in the set of generated SYN cookies corresponds to the ACK number, the ACK data message will be assumed to be part of an existing connection and the process will forward (at 535) the ACK data message to the destination (e.g., by forwarding the ACK data message to packet processing circuit 190) and the process ends.

If any generated SYN cookie in the set of generated SYN cookies corresponds to the ACK number, the ACK data message will be assumed to be a valid response to a generated SYN-ACK data message and the process will proceed to add (at 525) the source compute node or connection to the whitelist. In some embodiments, adding an entry to the whitelist comprises modifying a header vector of the ACK data message such that subsequent message processing actions add an entry corresponding to the source compute node or connection to the whitelist. As discussed in relation to FIG. 4, the whitelist, in some embodiments, is one of an exact match table and a bloom filter. The methods for adding entries to these types of whitelists has either been described above or is known to those of ordinary skill in the art.

The process then generates (at 530) a RST data message to reset the connection and initiate a new synchronization process for the connection. The RST data message, in some embodiments, includes information identifying the connection (e.g., header values that identify the source and destination IP, source and destination port, etc.) as well as a RST bit (flag) that indicates that the connection is no longer valid and must be reinitialized. A client receiving a data message with a RST bit set to one resends a SYN data message to establish the connection. In some embodiments, the received ACK data message is dropped or is replaced with the RST data message. In some embodiments, generating the RST data message comprises modifying header values of the received ACK data message. Modifying the headers, in some embodiments, includes swapping the source and destination IP and port fields and incrementing sequence number field values in the header as well as modifying bits identifying the data message as an ACK or RST data message to indicate that the data message is a RST instead of an ACK data message. Once the RST data message is generated, in some embodiments, the HV is updated to reflect the modified header values of the generated RST data message to be forwarded to the source of the ACK data message. One of ordinary skill in the art will appreciate that operations 525 and 530 are independent and, in some embodiments, are performed in parallel or in reverse order.

Once the RST data message is generated, the process forwards (at 535) the RST data message to the source compute node (e.g., client) that sent the received ACK data message and the process ends. The generated RST data message, in some embodiments, is forwarded based on a header vector associated with the generated RST data message as discussed above.

The generated RST data message then traverses the network and is received at the source compute node that sent the ACK data message in response to the generated SYN-ACK data message. The source compute node generates a new SYN data message in response to the received RST data message. The new SYN data message does not have limitations imposed by the forwarding element as the whitelist now contains an entry for the source compute node or connection. Thus, the new SYN data message will be processed by the destination compute node after being forwarded to the destination compute node as part of process 400 (by operations 405, 410, 425) and will be used to establish a connection with the destination compute node. In situations in which the whitelist is cleared between adding the entry to the whitelist and receiving the SYN data message, processes 400 and 500 will be applied to the new SYN message resulting in adding an entry to the cleared whitelist and generating a third SYN data message for the connection at which point data messages associated with the connection are processed as normal data messages.

Figure 6:
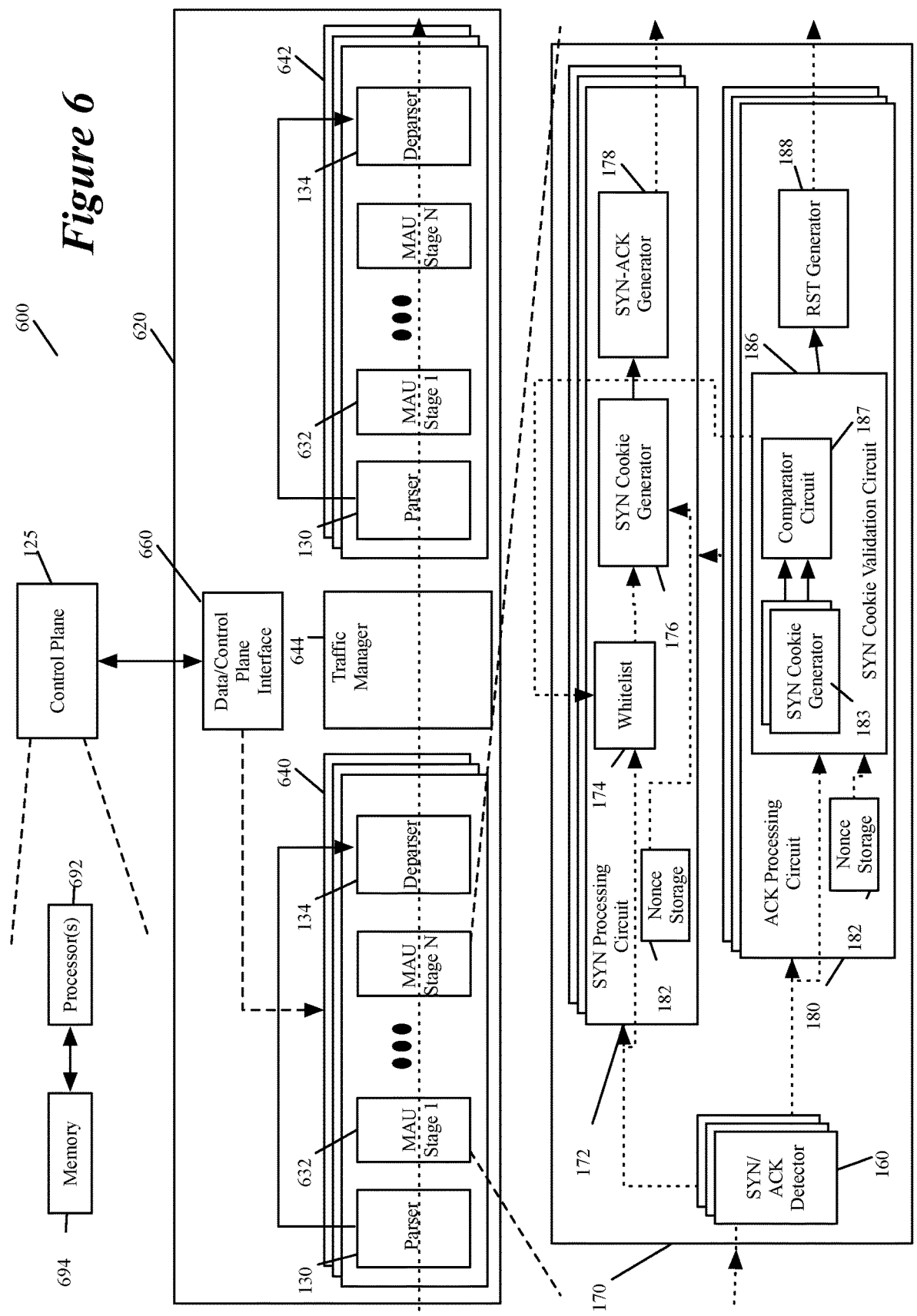
FIG. 6 illustrates a forwarding element that has a data-plane connection-validation circuit.

FIG. 6 illustrates a forwarding element 600 that has a data-plane connection-validation circuit 170 that includes (1) a set of SYN/ACK detectors, (2) a set of SYN-processing circuits 172 to process SYN data messages received by the data plane 120, (3) a set of ACK-processing circuits 180 to process ACK data messages received by the data plane 120, (4) a global whitelist 174 used by the set of SYN-processing circuits 172, and (5) a global nonce storage used by the set of SYN-processing circuits 172 and the set of ACK-processing circuits 180.

FIG. 6 illustrates that the data plane 620 of the forwarding element includes multiple ingress pipeline stages 640, multiple egress pipeline stages 642, and a traffic management stage 644. Each pipeline stage 640 or 642 is similar to a pipeline 128 of FIG. 1. The message processing stages in this example are match-action units (MAUs) 632. As shown in FIG. 6, the connection-validation circuit 170 is implemented by the configurable (i.e., programmable) MAUs 632 of the ingress pipelines 640 and the traffic manager 644. In some embodiments, the traffic manager (TM) 644 selects the egress pipeline that should process data messages generated by the connection validation circuit 170, and this selection then affects which data-plane egress port will receive the data message. FIG. 6 also illustrates that whitelist 174 and nonce storage 182.

As mentioned above, the control plane 125 configures the data plane 620. In some embodiments, the control plane includes (1) one or more processors 692 (such as a microprocessor with multiple processing cores or units) that execute instructions, and (2) a memory 694 that stores instructions for processes that when executed by the processors 692 perform the control plane operations. These instructions can be specified by (1) a manufacturer of the network forwarding element that includes the control and data planes 125 and 660, (2) a network administrator that deploys and maintains the network forwarding element, or (3) one or more automated processes that execute on servers and/or network forwarding elements that monitor network conditions. A processor 692, or another circuit of the control plane, communicates with the data plane (e.g., to configure the data plane or to receive statistics from the data plane) through the interface 660.

One of the sets of instructions (i.e., one of the programs) in the memory 694 that a processor 692 of the control plane 125 periodically executes in some embodiments generates a new value to be used as a nonce value. As described above the program may generate a new nonce value periodically, or upon detecting an event indicating a SYN flood attack may be underway. Another set of instructions (i.e., one of the programs) in the memory 694 that a processor 692 of the control plane 125 periodically executes in some embodiments clears the whitelist in order to minimize the number of false positives based on IP addresses (or other source or connection identifiers) added to a whitelist or entries added to a bloom filter whitelist.

FIG. 6 illustrates that SYN cookie validation circuit 186 includes a set of SYN cookie generators 183 and a comparator circuit 187. The set of SYN cookie generators 183, in some embodiments, generate a set of SYN cookies based on the attributes of the received ACK data message as described above as well as a nonce value provided by the control circuit. In some embodiments, each SYN cookie in the set of SYN cookies is generated based on a different nonce value stored in the nonce storage 182. SYN cookie validation circuit 186 also includes comparator circuit 187 that compares the generated SYN cookies to an ACK number (e.g., a sequence number included in an ACK data message) to determine if any of the SYN cookies is equal to the ACK number decremented by 1.

In some embodiments, SYN/ACK detector 160 is broken up in to a SYN detector and an ACK detector (not shown) that are implemented in different MAU stages. An ACK detector and subsequent ACK-processing circuit components, in some embodiments, are executed in a set of MAU stages the include at least one MAU stage prior to a set of MAU stages that execute SYN detection and SYN-processing circuit components. In some embodiments, at least a portion of the ACK-processing must precede the SYN-processing in order to add the entry to the whitelist executed by the MAU stage that implements the whitelist check based on an operation carried out in a previous MAU stage. In some embodiments, adding an entry to the whitelist is performed by modifying, at a first MAU stage, a header value that is passed to a subsequent MAU stage that implements the whitelist. In other embodiments, adding an entry to a whitelist is performed within a single MAU stage using components of the MAU described below.

A single MAU stage, in some embodiments, executes a SYN detector, whitelist 174, nonce storage 182, SYN cookie generator 176 and SYN-ACK generator 178. In such embodiments, the whitelist can be checked based on a match in a match table (described below) that indicates that the header vector includes a SYN flag. In other embodiments, A SYN detector indicates that a whitelist should be checked in a subsequent MAU stage by modifying a header vector to trigger a whitelist check. Similarly, generating a SYN cookie and a SYN-ACK data message, in some embodiments, are triggered by a process internal to a single MAU stage, while in other embodiments, a first MAU stage triggers (through a modified header vector) a subsequent MAU stage to calculate the SYN cookie (e.g., calculate a hash of header values), and the first or subsequent MAU stage triggers a subsequent MAU stage to include the SYN cookie in a SYN-ACK data message.

Figure 7:
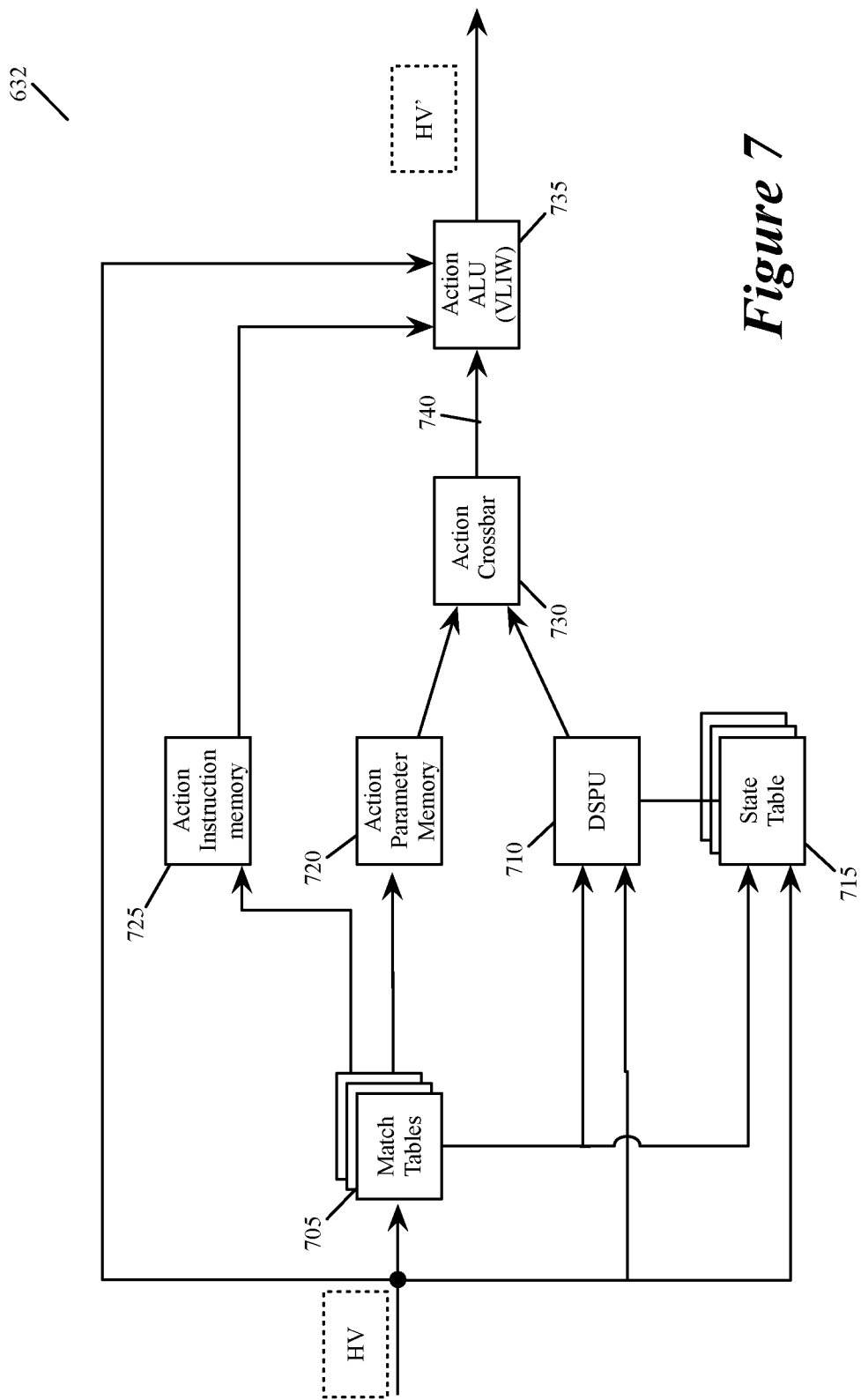
FIG. 7 illustrates examples of stateful memories and processing units that some embodiments use in a match action unit to implement the various components of the connection-validation circuit.

FIG. 7 illustrates examples of stateful memories and processing units that some embodiments use in a match action unit 632 to implement the various components of the connection-validation circuit 170 (e.g., the SYN-processing circuit 172, whitelist 174, SYN cookie generator circuit 176, SYN-ACK generator 178, ACK-processing circuit 180, nonce storage 182, hash calculation circuit set 184, SYN cookie validation circuit 186, RST generator 188, and the packet forwarding circuit 190). As mentioned above, an ingress pipeline 640 or egress pipeline 642 in some embodiments has several MAU stages 632, each of which includes message-processing circuitry for forwarding received data messages and/or performing stateful operations based on header vectors associated with the data message. In some embodiments, the control plane 125 of the forwarding element 600 or a remote control plane configures the MAU stages 632 of the data plane 620 to implement not only the forwarding operations of these MAU stages, but also the connection validation operations that some of these MAU stages 632 perform. These operations are performed by processing values stored in the header vectors that are generated for the data messages.

The stateful operations of the data plane are enabled by the data plane's ability to store data that it generates from processing earlier data messages for processing subsequent data messages. To perform stateful operations, each MAU stage 632 in some embodiments includes a data plane stateful processing unit (DSPU) 710 and a set of one or more stateful tables 715, as shown in FIG. 7. As further described below, the data plane 620 in some embodiments implements the whitelist 174 and the nonce storage 182 with the stateful components 710 and 715 of the MAU 632.

In addition to the DSPU 710 and stateful tables 715, the MAU stage 632 in some embodiments has a set of one or more match tables 705, an action crossbar 730, an action parameter memory 720, an action instruction memory 725, and an arithmetic logic unit (ALU) 735. The match table set 705 can compare one or more fields in a received message's header vector (HV) to identify one or more matching flow entries (i.e., entries that match the message's HV). The match table set 705 can include TCAM tables or exact match tables in some embodiments. In some embodiments, the match table set can be accessed at an address that is a value extracted from one or more fields of the message's header vector, or it can be a hash of this extracted value. In some embodiments, the local control plane or a remote controller supplies flow entries (e.g., the flow-match identifiers and/or action identifiers), to store in one or more match tables and associated action tables.

In some embodiments, the value stored in a match table record that matches a message's flow attributes, or that is accessed at a hash-generated address from one or more message flow attributes, provides addresses of records to access in the action parameter memory 720 and action instruction memory 725. The actions performed by the MAU stage 632 can include actions that the forwarding element has to perform on a received data message to process the data message (e.g., to drop the message, or to forward the message to its destination machine or to other intervening forwarding elements). In some embodiments, these actions also include a subset of the connection validation operations that were described above.

Also, in some embodiments, the value stored in a match table record that matches a message's flow identifier, or that is accessed at a hash-generated address, can provide an address and/or parameter for one or more records in the stateful table set 715, and can provide an instruction and/or parameter for the DSPU 710. As shown, the DSPU 710 and the stateful table set 715 also receive a processed message's header vector. The header vectors can include instructions and/or parameters for the DSPU, while containing addresses and/or parameters for the stateful table set 715.

The DSPU 710 in some embodiments performs one or more stateful operations, while a stateful table 715 stores state data used and generated by the DSPU 710. In some embodiments, the DSPU is a set of one or more programmable ALUs that performs operations synchronously with the data flow of the message-processing pipeline (i.e., synchronously at the data line rate of the data plane 620). As such, the DSPU can process a different header vector on every clock cycle, thus ensuring that the DSPU would be able to operate synchronously with the dataflow of the message-processing pipeline.

In some embodiments, the local or remote control plane provides configuration data to program the DSPUs 710 of the MAUs 632 of the data plane 620. The DSPU 710 outputs an action parameter to the action crossbar 730. The action parameter memory 720 also outputs an action parameter to this crossbar 730. The action parameter memory 720 retrieves the action parameter that it outputs from its record that is identified by the address provided by the match table set 705. The action crossbar 730 in some embodiments maps the action parameters received from the DSPU 710 and action parameter memory 720 to an action parameter bus 740 of the action ALU 735. This bus provides the action parameter to this ALU 735. For different data messages, the action crossbar 730 can map the action parameters from DSPU 710 and memory 720 differently to this bus 740. The crossbar can supply the action parameters from either of these sources in their entirety to this bus 740, or it can concurrently select different portions of these parameters for this bus.

The action ALU 735 also receives an instruction to execute from the action instruction memory 725. This memory 725 retrieves the instruction from its record that is identified by the address provided by the match table set 705. The action ALU 735 also receives the header vector for each message that the MAU processes. Such a header vector can also contain a portion or the entirety of an instruction to process and/or a parameter for processing the instruction.

The action ALU 735 in some embodiments is a very large instruction word (VLIW) processor. The action ALU 735 executes instructions (from the instruction memory 725 or the header vector) based on parameters received on the action parameter bus 740 or contained in the header vector. The action ALU stores the output of its operation in the header vector in order to effectuate a message forwarding operation and/or stateful operation of its MAU stage 632. The output of the action ALU forms a modified header vector (HV') for the next MAU stage or the deparser. In some embodiments, examples of such actions include writing into the modified header vector the values output from the learn cache, mapping table, match table, metadata storages, etc.

In other embodiments, the match tables 705 and the action tables 715, 720 and 725 of the MAU stage 632 can be accessed through other methods as well. For instance, in some embodiments, each action table 715, 720 or 725 can be addressed through a direct addressing scheme, an indirect addressing scheme, and an independent addressing scheme. The addressing scheme that is used depends on the configuration of the MAU stage, which in some embodiments, is fixed for all data messages being processed, while in other embodiments can be different for different data messages being processed.

In the direct addressing scheme, the action table uses the same address that is used to address the matching flow entry in the match table set 705. As in the case of a match table 705, this address can be a hash generated address value or a value from the header vector. Specifically, the direct address for an action table can be a hash address that a hash generator (not shown) of the MAU generates by hashing a value from one or more fields of the message's header vector. Alternatively, this direct address can be a value extracted from one or more fields of the header vector.

On the other hand, the indirect addressing scheme accesses an action table by using an address value that is extracted from one or more records that are identified in the match table set 705 for a message's header vector. As mentioned above, the match table records are identified through direct addressing or record matching operations in some embodiments.

The independent address scheme is similar to the direct addressing scheme except that it does not use the same address that is used to access the match table set 705. Like the direct addressing scheme, the table address in the independent addressing scheme can either be the value extracted from one or more fields of the message's header vector, or it can be a hash of this extracted value. In some embodiments, not all the action tables 715, 720 and 725 can be accessed through these three addressing schemes, e.g., the action instruction memory 725 in some embodiments is accessed through only the direct and indirect addressing schemes. Also, other addressing schemes are used to address some of the tables (e.g., action tables).

Several of the above described embodiments implement connection validation in network forwarding elements such as switches and routers. In other embodiments, the network forwarding element that performs the flow learning are other types of forwarding elements, such as network interface cards, etc. Also, in several above-described embodiments, information is shared between the message processing stages by recording the information in header vectors processed by the processing stages. In other embodiments, the information is shared between the different stages through data buses between these stages. Accordingly, one of ordinary skill in the art would understand that the invention is not to be limited by the foregoing illustrative details, but rather is to be defined by the appended claims.

The invention claimed is:

1. A data-plane circuit for use in a network forwarding element, the data-plane circuit being for forwarding data messages within a network, the data-plane circuit comprising:
a plurality of ports to receive and transmit data messages; and
a plurality of programmable message processing stages, comprising hardware, to process data tuples associated with the received data messages,
a first set of message processing stages programmed to implement a connection-validation circuit to validate source internet protocol (IP) addresses of a set of received data messages, while a second set of programmable message processing stages is programmed to perform data message forwarding operations in order to forward the data messages within the network;
wherein:
the first set of programmable message processing stages are to implement connection validation operations of the connection-validation circuit based, at least in part, upon a source-IP-based whitelist;
the whitelist is for use in determining message generation and message forwarding; and
after receiving a synchronization (SYN) data message for a destination compute node from a source compute node, the connection validation operations comprise consulting the source-IP-based whitelist to determine whether the whitelist indicates that a SYN data message should be forwarded to the destination compute node or whether the whitelist indicates that a SYN-acknowledgment (ACK) data message should be generated by the connection-validation circuit.

2. The data-plane circuit of claim 1, wherein
the message processing stages comprise programmable components,
the first set of programmable message processing stages implements the connection-validation circuit after the programmable components of the first set of programmable message processing stages are programmed to perform the connection validation operations of the connection-validation circuit, and
the second set of programmable message processing stages performs the data message forwarding operations of the data-plane circuit after the set of programmable components of the second set of programmable message processing stages are programmed to process data tuples associated with the received messages to forward the data messages within the network.

3. The data-plane circuit of claim 2 wherein the connection validation operations of the connection-validation circuit comprise:
when the whitelist indicates that a SYN-ACK data message should be generated, generating a SYN-ACK data message in response to the received SYN data message; and
forwarding the SYN-ACK data message to the source compute node.

4. The data-plane circuit of claim 3, wherein generating the SYN-ACK data message comprises using a hash-calculation circuit of the data-plane circuit to calculate a hash that is inserted as an initial sequence number for the SYN-ACK data message, the connection validation operations of the connection-validation circuit further comprise:
   determining whether an ACK data message received is a valid response to a SYN-ACK data message generated by the connection-validation circuit, the determination based on the sequence number included in the ACK data message using a hash calculation circuit of the data-plane circuit; and
   when the ACK data message is a valid response,
      adding an entry to the source-IP-based whitelist to indicate that future SYN data messages from the source IP address of the ACK data message should be forwarded to the destination compute node,
      generating a reset (RST) data message, and
      forwarding the RST data message to the source IP address.

5. The data-plane circuit of claim 4, the connection validation operations of the connection-validation circuit further comprising:
   when the whitelist indicates that the SYN data message should be forwarded to the destination compute node, forwarding the SYN data message to the destination compute node; and
   when an ACK data message received is not a valid response, forwarding the ACK data message to the destination of the ACK data message.

6. The data-plane circuit of claim 1, wherein the set of received data messages comprises acknowledgment (ACK) data messages of a transmission control protocol (TCP).

7. The data-plane circuit of claim 6, wherein the connection-validation circuit comprises the whitelist to store data indicating that particular source IP addresses have been validated.

8. The data-plane circuit of claim 7, wherein the whitelist is implemented as a bloom filter and the connection-validation circuit comprises a plurality of hash-calculation circuits to calculate hash values based on at least a source IP address of a received data message used to implement the bloom filter.

9. The data-plane circuit of claim 8, wherein an entry corresponding to a particular IP address is added to the whitelist when an ACK data message received from the particular source IP address has been validated by the connection-validation circuit based on a sequence number of the ACK data message.

10. The data-plane circuit of claim 9, wherein entries of the bloom filter are cleared at least one of periodically and based on detecting an event.

11. The data-plane circuit of claim 7, wherein the connection-validation circuit determines, for a source IP address of the received synchronization (SYN) data message, that the whitelist indicates that the source IP has been validated and forwards the SYN data message to a destination address of the SYN data message.

12. The data-plane circuit of claim 7, the connection-validation circuit further to:
   determine, for a source IP address of the received synchronization (SYN) data message, that the whitelist does not indicate that the source IP has been validated;
   generate the SYN-ACK data message in response to the received SYN data message; and
   forward the SYN-ACK data message to the source of the SYN data message.

13. The data-plane circuit of claim 12, wherein the connection-validation circuit comprises a set of hash-calculation circuits, and wherein generating the SYN-ACK data message comprises using a hash-calculation circuit in the set of hash-calculation circuits to generate a hash value based on a set of data message attributes, the generated hash value used as an initial sequence number in the SYN-ACK data message.

14. The data-plane circuit of claim 13, wherein the set of data message attributes comprise a source internet protocol (IP) address, a destination IP address, a source port, and a destination port.

15. The data-plane circuit of claim 13, wherein the generated hash value is also used in a timestamp field in the generated SYN-ACK data message.

16. The data-plane circuit of claim 13, wherein the generated hash value is further based on an additional value provided by a control circuit.

17. The data-plane circuit of claim 16, wherein the additional value provided by a control circuit is updated by the control circuit at least one of periodically and based on the detection of an event, and wherein the connection-validation circuit stores a current value of the additional value and an immediately previous value of the additional value.

18. An apparatus comprising:
   a forwarding element comprising:
      circuitry, comprising hardware, to:
         receive a synchronization (SYN) data message for a destination device separate from the forwarding element and
         generate a SYN-ACK data message in response to the received SYN data message and send the generated SYN-ACK data message to sender of the SYN data message;
   wherein:
      the circuitry is programmable to implement connection validation operations based, at least in part, upon a source-IP-based whitelist;
      the whitelist is for use in determining message generation and message forwarding;
      the synchronization (SYN) data message is from a source compute node; and
      after receiving the synchronization (SYN) data message from the source compute node, the connection validation operations comprise consulting the source-IP-based whitelist to determine whether the whitelist indicates that the SYN data message should be forwarded to the destination device or whether the whitelist indicates that the SYN-acknowledgment (ACK) data message should be generated by the circuitry.

19. The apparatus of claim 18, wherein the forwarding element comprises circuitry to: based on identification of a sender of the SYN data message as a permitted sender, forwarding the SYN data message to the destination device.

20. The apparatus of claim 18, wherein the generated SYN-ACK data message is identified as response to the SYN data message from a destination compute node.

* * * * *